(No Model.)
R. D. EYRE.
METHOD OF AND MACHINE FOR ELECTRIC WELDING.
No. 585,160. Patented June 22, 1897.
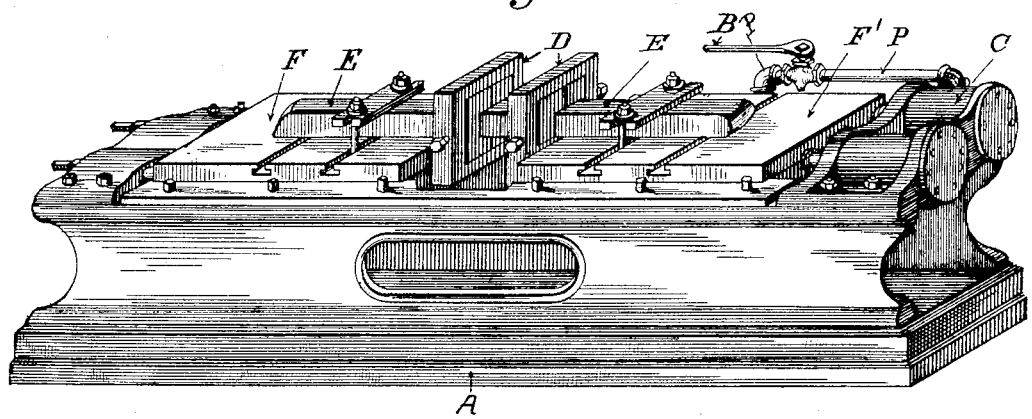
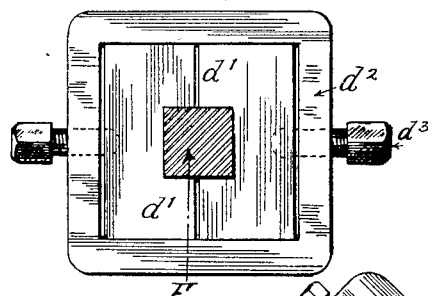
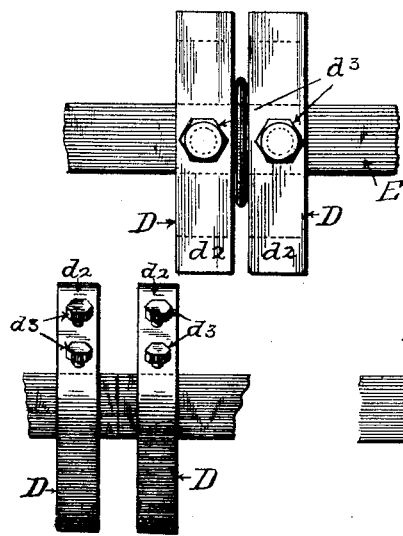
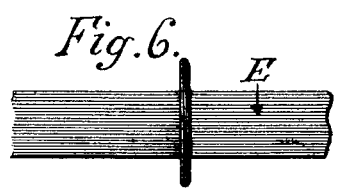
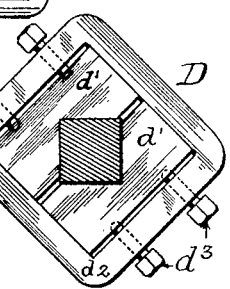
WITNESSES:
INVENTOR
Richard Duty Eyre

UNITED STATES PATENT OFFICE.

RICHARD DERBY EYRE, OF JOHNSTOWN, PENNSYLVANIA.

METHOD OF AND MACHINE FOR ELECTRIC WELDING.

SPECIFICATION forming part of Letters Patent No. 585,160, dated June 22, 1897.

Application filed October 30, 1896. Serial No. 610,585. (No model.)

*To all whom it may concern:*

Be it known that I, RICHARD DERBY EYRE, of Johnstown, in the county of Cambria, State of Pennsylvania, have invented certain new and useful Improvements in Methods of and Machines for Electric Welding, of which the following is a specification.

My invention relates to the art of electric welding, and has for its primary object the provision of a method by which welds may be made having a much larger degree of ductility than can be obtained by the methods now used.

Other objects of my invention will be disclosed hereinafter.

It is a fact known to those skilled in the art that electric welds as made by the usual process have not the uniform character desired and are more or less brittle. This brittleness is present to a very troublesome extent in the case of steel-welding and to a greater or less extent in the welding of other metals. I shall refer more particularly to steel hereinafter, but I do not limit myself to the use of my invention with the welding of steel alone.

The process of electric welding ordinarily employed may be outlined as follows: The pieces to be welded are securely clamped with their ends juxtaposed upon a welding-machine. A good electrical connection is made between each piece and one of the terminals of a low-potential electric circuit of large volume. The current passes through the pieces to be welded, and the greatest resistance to the passage of the current being at the joint between the pieces the heat first develops at this joint. As soon as the proper welding temperature is reached one piece is pushed toward the other, usually by hydraulic pressure, and the weld is considered finished. The amount of pressure given to the metal depends upon the resistance of the metal and is dependent, therefore, upon the degree of temperature and the amount of upset it is thought best to give. It is well known that very highly heated steel is rendered extremely brittle thereby, but ordinarily the ductility of steel which has been rendered brittle by overheating may be restored either by subsequent heat treatment or by subsequent forging. The ductility of steel rendered brittle by electric welding cannot be thus restored. I have found that this fact is due to the upset which is given the metal while at the welding temperature. This upset tends to separate the structure and fixes permanently the brittleness primarily caused merely by overheating. My novel method of welding meets this difficulty by strongly compressing the upset metal as it is formed with a pressure much in excess of that ordinarily used to make a weld. As a result I bring the molecules of the steel again in due contact with each other and produce a small-grained structure before the steel has become fixed with that weak structure which the upset tends to perpetuate and which it does perpetuate by the usual manner of welding.

Referring to the drawings, Figure 1 is a perspective view of an electric welding-machine, showing bars set up in the machine to be butt-welded by my method. Fig. 2 is an end view of one of the dies D of Fig. 1. Fig. 3 is a side view showing the appearance of the bar still surrounded by the dies at the end of the welding operation. Fig. 4 is a side view of parts of two bars to be welded, each bar being surrounded by a die like that shown in Fig. 3. Fig. 5 is an end view similar to Fig. 2, but showing a somewhat different form of die. Fig. 6 shows the same bar after removal from the dies.

A represents the base of an ordinary type of electric welding-machine, within which are the alternating-current transformers, whose secondary poles are the tables F F'. Clamped upon these tables by any suitable means are the bars E E to be welded, said bars receiving the secondary current from the transformers on their under side.

D D are dies secured about the bars E E, as shown. I have shown these dies constructed in a very simple manner. Metal blocks $d'$ $d'$ are surrounded by a clamp $d^2$. $d'$ $d'$ are shaped so as to adapt them to receive the bar E between them, and set-screws $d^3$ $d^3$ force the blocks $d'$ $d'$ strongly against the periphery of the bar E, holding the bar rigidly between them. D D may be secured also to the tables F F', if desired, but if so secured they should be insulated therefrom to secure the best results. This, however, is not essential, as the dies may be used even as the terminals.

C C are the cylinders, in which move hydraulically-actuated plungers, the combination being adapted for a high-water pressure. The water enters the cylinders by means of pipes P P (only partly shown) from an accumulator or other apparatus for supplying the requisite pressure. By turning the lever B the water is turned into the cylinders and the table F' is moved toward the table F.

I have not shown any arrangement for turning on and off or regulating the electric current to be passed through the pieces to be welded, as any method of regulating the current known in the art may be used in conjunction with my improved method of welding.

The preferable projection between the edge of the tables and the joint and the preferable distance between the faces of the dies are details governed by the shape and size of the pieces E E and other conditions of manufacture. I prefer to make the distance between the faces of the dies as short as is compatible with economic heating. I also prefer to make the dies thick enough to reach nearly to the tables F F'.

To obtain a weld by which the pieces are completely united, the steel after welding remaining as strong and ductile as possible, I would arrange the bars substantially as shown in Fig. 4, clamp them securely to the tables, pass the current through the joint until the metal has become plastic, and then upset and flatten the heated metal between the faces of D D, exerting upon said metal a force of from twenty-five thousand to fifty thousand pounds per square inch of section. The collar, as shown in Fig. 6, surrounding the bar may be easily cut or broken off. Steel welded in this manner is stronger, more ductile, and smaller grained than that welded by any other electrical method known to me.

If for any reason, such as scarcity of electrical power, it is desirable to make the weld at a lower temperature than that usually considered essential, the process is the same except that a temperature varying from about a bright cherry-red to a low white may be given, and it is advantageous to increase the mechanical pressure given at the end of the operation. A weld of this kind within limits will be stronger the higher the pressure and temperature given, and for the lower temperatures in the range mentioned the pieces will not have entirely coalesced. This imperfect union, however, has more strength than that resulting from the ordinary methods of welding.

The proper projection to be used when making electric welds is often difficult to determine. With a comparatively long projection less heat is taken away from the joint by the cold terminals, and the current having a longer distance to traverse before reaching the joint becomes more uniformly spread throughout the section, but a long projection has the disadvantage of not concentrating the heat as much as is desirable at and near the joint, so that the pieces when upset are liable to buckle. By the use of blocks, such as the dies I describe, about the pieces to be welded I obtain the hereinbefore-mentioned advantages of a long projection without its incumbent disadvantages.

The use of my method for welding pieces of irregular section, such as rails, is attended with some added advantages. The welding of irregular sections presents difficulties arising from the tendency of some portions of the section to heat more quickly than other portions. By using dies substantially as described and flattening the pieces between them with heavy pressure there may be a marked difference of temperature between different portions of the section without any substantial injury being given to the quality of the weld, for the colder portions will have stuck sufficiently, while the hotter portions will not have been deteriorated. My method simultaneously prevents the presence of "burns" and cavities arising from "burning," coarse crystallization arising from "overheating," and weak sticking, usually a result of insufficient temperature.

I wish to be understood as not limiting myself to the exact details described or shown in the drawings. My dies may be shaped, constructed, and held in position very differently from those here shown without departing from the scope of my invention. By modifying my method as herein shown I may use combined terminals and dies, so that I do not limit myself to the use of dies insulated from the terminals.

What I claim, and desire to protect by Letters Patent, is—

1. The method of electric welding herein set forth, which consists in heating the ends of the articles to be welded by a suitable supply of electric current, upsetting the heated ends, and compressing the upset metal as it is formed with a pressure largely in excess of that required to form a weld.

2. In an electric heating apparatus, the combination with the transformer terminals and means for clamping the articles to be heated in contact therewith, of removable dies, adapted to be rigidly secured about the said articles contiguous to the ends thereof.

In testimony whereof I have affixed my signature in presence of two witnesses.

RICHARD DERBY EYRE.

Witnesses:
E. B. ENTWISLE,
H. W. SMITH.